United States Patent
Kase et al.

(10) Patent No.: US 9,876,228 B2
(45) Date of Patent: Jan. 23, 2018

(54) NICKEL-COBALT COMPOSITE HYDROXIDE AND PROCESS FOR MANUFACTURING SAME

(71) Applicant: SUMITOMO METAL MINING CO., LTD., Tokyo (JP)

(72) Inventors: Katsuya Kase, Ehime (JP); Yasutaka Kamata, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/286,093

(22) Filed: Oct. 5, 2016

(65) Prior Publication Data

US 2017/0025679 A1 Jan. 26, 2017

Related U.S. Application Data

(63) Continuation of application No. 14/764,702, filed as application No. PCT/JP2013/083896 on Dec. 18, 2013.

(30) Foreign Application Priority Data

Jan. 30, 2013 (JP) ................................ 2013-015036

(51) Int. Cl.
*H01M 4/505* (2010.01)
*H01M 4/525* (2010.01)
(Continued)

(52) U.S. Cl.
CPC ............ *H01M 4/525* (2013.01); *C01G 53/00* (2013.01); *C01G 53/006* (2013.01);
(Continued)

(58) Field of Classification Search
CPC .. H01M 4/505; H01M 4/525; H01M 10/0525; H01M 2220/20; H01M 2220/30;
(Continued)

(56) References Cited

U.S. PATENT DOCUMENTS

| 2012/0276454 A1* | 11/2012 | Mori ................ H01M 4/485 429/223 |
| 2013/0302683 A1* | 11/2013 | Kang ................ H01M 4/485 429/220 |
| 2014/0227594 A1* | 8/2014 | Song ................ C01D 15/02 429/219 |

FOREIGN PATENT DOCUMENTS

| JP | S63-114063 A | 5/1988 |
| JP | S63-211565 A | 9/1988 |

(Continued)

OTHER PUBLICATIONS

Feb. 4, 2014 Search Report issued in International Application No. PCT/JP2013/083896.
Jul. 5, 2016 Office Action Issued in U.S. Appl. No. 14/764,702.

*Primary Examiner* — Brittany Raymond
(74) *Attorney, Agent, or Firm* — Oliff PLC

(57) ABSTRACT

Process for manufacturing nickel-cobalt composite represented by $Ni_{1-x-y}Co_xMn_yM_z(OH)_2$ (where, $0.05 \leq x \leq 0.95$, $0 \leq y \leq 0.55$, $0 \leq z \leq 0.1$, $x+y+z<1$, and M is at least one metal-element selected from Al, Mg, and the like), includes: forming seed particle, while reaction solution having mixed solution containing metal compounds and ammonia solution containing ammonium ion supply source at discharge head of an impeller from 50-100 $m^2/s^2$, the concentration of nickel ions is maintained within range 0.1-5 ppm by mass, whereby seed particles are formed; and growing seed particle wherein solution is obtained by supplying mixed and ammonium solutions to reaction solution is agitated with a concentration of nickel ions being maintained within range 5-300 ppm by mass and higher than the concentration of nickel ions in seed particle formation, whereby seed particles are grown up.

3 Claims, 1 Drawing Sheet

(51) Int. Cl.
*H01M 10/0525* (2010.01)
*C01G 53/00* (2006.01)
*H01M 4/02* (2006.01)

(52) U.S. Cl.
CPC ....... *H01M 4/505* (2013.01); *H01M 10/0525* (2013.01); *C01P 2004/51* (2013.01); *C01P 2004/61* (2013.01); *H01M 2004/028* (2013.01); *H01M 2220/20* (2013.01); *H01M 2220/30* (2013.01); *Y02E 60/122* (2013.01)

(58) Field of Classification Search
CPC .... Y02E 60/122; C01G 53/00; C01G 53/006; C01P 2004/51; C01P 2004/61
See application file for complete search history.

(56) References Cited

FOREIGN PATENT DOCUMENTS

| | | |
|---|---|---|
| JP | H08-213015 A | 8/1996 |
| JP | H09-270258 A | 10/1997 |
| JP | 2011-116580 A | 6/2011 |
| JP | 2011-201764 A | 10/2011 |
| WO | 2012/165654 A1 | 12/2012 |
| WO | 2012/169274 A1 | 12/2012 |

\* cited by examiner

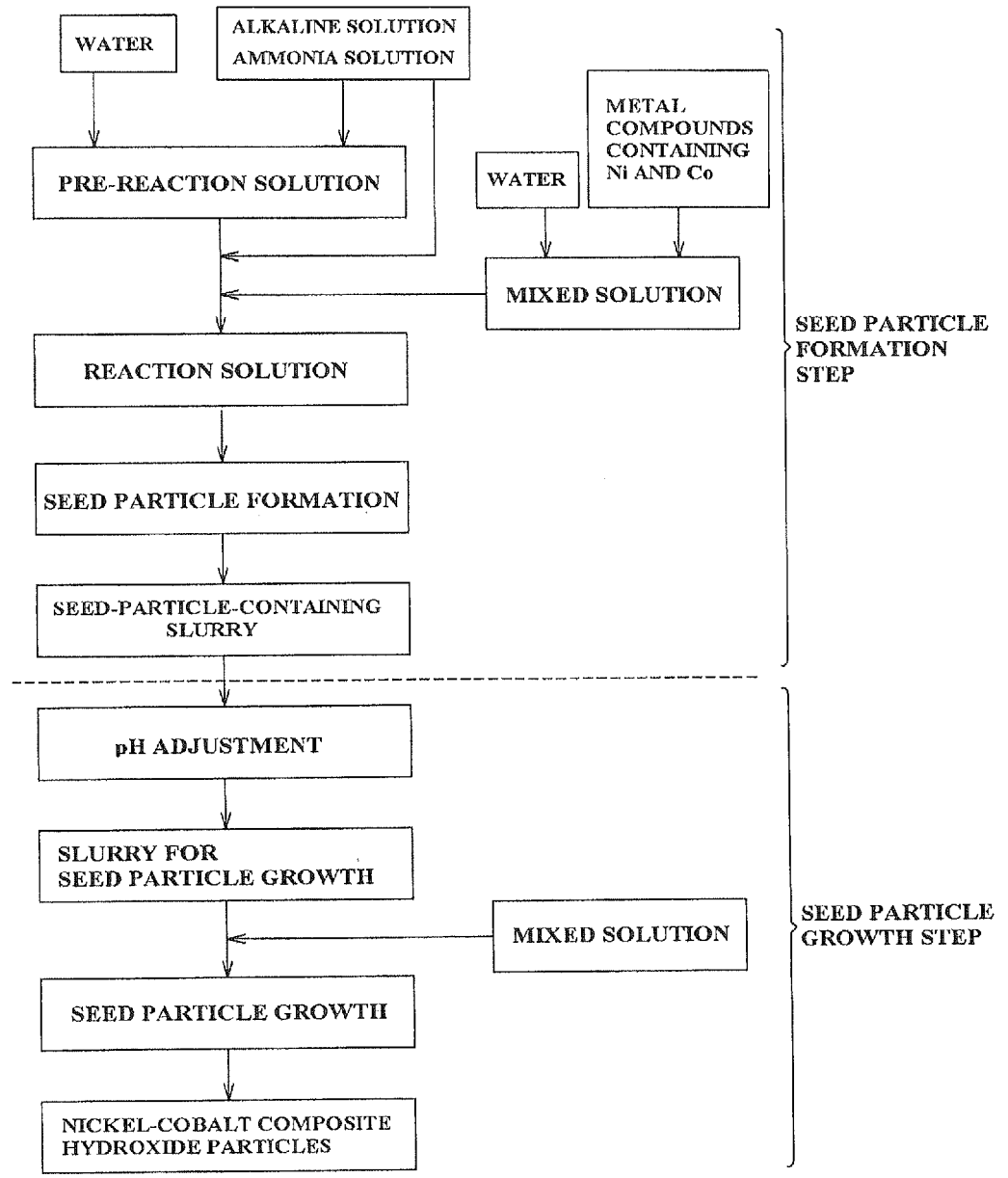

NICKEL-COBALT COMPOSITE HYDROXIDE AND PROCESS FOR MANUFACTURING SAME

This application is a continuation of U.S. application Ser. No. 14/764,702, filed Jul. 30, 2015, which is a national stage of PCT/JP2013/083896, filed Dec. 18, 2013, which claims the benefit of priority to Japanese Application No. 2013-015036, filed Jan. 30, 2013. The entire contents of the prior applications are hereby incorporated by reference herein in their entirety.

FIELD OF THE INVENTION

The present invention relates to a nickel-cobalt composite hydroxide which has a uniform particle diameter and is for use as a precursor of a positive electrode active material for nonaqueous electrolyte secondary batteries, and relates to a process for manufacturing the nickel-cobalt composite hydroxide. The present application claims priority based on Japanese Patent Application No. 2013-015036 filed in Japan on Jan. 30, 2013. The total contents of the Patent Application are to be incorporated by reference into the present application.

BACKGROUND ART

In recent years, as electronic technology progresses, reduction in size and weight of electronic devices has been rapidly progressing. Particularly, because of the recent spread and the increase in functionality of portable electronic devices, such as cell phones and notebook-sized personal computers, the development of a small and light-weight battery having a high energy density has been strongly desired as a portable power source to be used for those portable electronic devices.

Lithium ion secondary batteries, which are nonaqueous-electrolyte secondary batteries, are small in size and have a high energy, and therefore, have been already applied as a power source for portable electronic devices. Furthermore, lithium ion secondary batteries find applications other than those limited applications, and, there have been also carried out the research and development of lithium ion secondary batteries to make use of the batteries as a large-sized power source for hybrid vehicles, electric vehicles, and the like.

As a positive electrode active material for lithium ion secondary batteries, lithium-cobalt composite oxide (LiCoO$_2$), which is relatively easily synthesized, has been made use of, but, as a raw material of lithium-cobalt composite oxide, a cobalt compound, which is rare and expensive to be produced, has been used, and therefore, an increase in the cost of the positive electrode active material has been caused. A reduction in the cost of the positive electrode active material and the resulting realization of manufacturing of more-inexpensive lithium ion secondary batteries can be said to have great industrial significance because such cost reduction and realization allow the cost of currently-widespread portable electronic devices to be reduced and lithium ion secondary batteries to be loaded into future large-sized power sources.

Examples of other positive electrode materials applicable as a positive electrode active material for lithium ion secondary batteries include lithium-manganese composite oxide (LiMn$_2$O$_4$), in which manganese, more inexpensive than cobalt, is contained; and lithium-nickel composite oxide (LiNiO$_2$), in which nickel, more inexpensive than cobalt, is contained.

Lithium-manganese composite oxide is not only made of an inexpensive raw material, but also has high thermal stability, particularly, has high safety from ignition and the like, and therefore, it can be said that lithium-manganese composite oxide is an effective alternative material for lithium-cobalt composite oxide.

However, lithium-manganese composite oxide has only approximately half the theoretical capacity of lithium-cobalt composite oxide, and hence, has the disadvantage of difficulty in satisfying yearly-increasing demands for a high-capacity lithium ion secondary battery. Furthermore, lithium-manganese composite oxide has the disadvantages of intense self-discharge at not less than 45° C. and the resulting decrease in charge-and-discharge life.

On the other hand, lithium-nickel composite oxide has the advantage of having a higher capacity than that of lithium-cobalt composite oxide, which has been currently a main-stream, and has the advantages that nickel, a raw material, is more inexpensive and more stably available than cobalt, and therefore, lithium-nickel composite oxide has been expected as a next-generation positive electrode material, and the research and development of lithium-nickel composite oxide have been actively carried out.

However, lithium-nickel composite oxide has a problem that, in the case where a lithium ion secondary battery is produced using, as a positive electrode active material, a lithium-nickel composite oxide which is constituted not by substituting nickel with another element, but by using only purely nickel, the lithium-nickel composite oxide has poorer cycle characteristics than lithium-cobalt composite oxide. The reason for this is considered to be that the crystal structure of lithium-nickel composite oxide changes from hexagonal to monoclinic with the desorption of lithium, and furthermore, changes to hexagonal again, and this crystal structure change is poor in reversibility, and therefore, as a charge-and-discharge reaction is repeated, sites for insertion and desorption of Li are lost little by little.

To solve this problem, the substitution of cobalt for a part of nickel has been proposed (for example, refer to Patent documents 1 to 3). The substitution with cobalt prevents the phase transition of the crystal structure caused by the desorption of lithium, and a larger amount of substitution with cobalt allows a crystal phase to be more stable, whereby cycle characteristics are improved.

An object of the addition of cobalt is to stabilize a crystal phase by substituting cobalt for nickel present in a crystal structure, and therefore, cobalt and nickel need to be uniformly mixed at the atomic level. Effective is a process in which a hydroxide produced by continuously coprecipitating a nickel source and a cobalt source is used as a raw material of a positive electrode active material which realizes the object.

For example, Patent document 4 discloses that the control of the particle shape, the particle diameter, the specific surface area, the tap density, the pore space volume, and the pore filling factor of a nickel-cobalt coprecipitation hydroxide prevents cycle deterioration and achieves a battery having excellent charge-and-discharge characteristics, and, actually, such control has achieved certain characteristics.

However, a conventional process for the foregoing synthesis of a hydroxide by continuously coprecipitating a nickel source and a cobalt source has a problem that it is difficult to manufacture a nickel-cobalt composite hydroxide having a uniform particle diameter. This is because, in the manufacturing of nickel-cobalt composite hydroxide by a continuous crystallization reaction, nucleation by precipitation and a growth reaction of each of particles simultaneously proceed.

In the case where a positive electrode active material having a wide distribution of particle size is used, non-uniform voltages are applied to particles in an electrode, and accordingly, a repetition of charge and discharge causes the selective deterioration of fine particles and a decrease in capacity. Therefore, a positive electrode active material is required to comprise particles having a uniform and appropriate particle diameter.

As for achieving a uniform particle diameter, for example, Patent document 5 proposes a process for manufacturing nickel-cobalt-manganese composite hydroxide particles, the process including: a nucleation step in which nucleation is performed by controlling a solution for nucleation so as to achieve a pH value of from 12.0 to 14.0, the pH value being measured at a reference liquid temperature of 25° C.; and a particle growth step in which a solution for particle growth containing nuclei formed in the nucleation step is controlled so as to have a pH value of from 10.5 to 12.0 to grow the foregoing nuclei, the pH value being measured at a reference liquid temperature of 25° C.

Patent document 5 describes that the separate implementation of the nucleation and the particle growth allows the achievement of nickel-cobalt-manganese composite hydroxide particles having a small particle diameter and a uniform distribution of particle size, and a positive electrode active material manufactured using these particles as a raw material is excellent in particle diameter uniformity.

However, in Patent document 5, an index indicating the degree of a particle size distribution, namely, [(d90−d10)/average particle diameter] is not more than 0.55, and hence, in the case of a biased distribution of particle size, it cannot necessarily be said that fine particles or coarse particles are prevented from being mixed in. Furthermore, the foregoing manufacturing process is limited to a batch type, and hence, the process cannot be said to have high manufacturing efficiency.

Therefore, there has been demanded a positive electrode active material in which fine particles and coarse particles are further prevented from being mixed in, which has high particle-diameter-uniformity, and which is capable of being manufactured with high productivity.

PRIOR-ART DOCUMENTS

Patent Documents

Patent document 1: Japanese Patent Application Laid-Open No. S63-114063
Patent document 2: Japanese Patent Application Laid-Open No. S63-211565
Patent document 3: Japanese Patent Application Laid-Open No. H08-213015
Patent document 4: Japanese Patent Application Laid-Open No. H09-270258
Patent document 5: Japanese Patent Application Laid-Open No 2011-116580

SUMMARY OF THE INVENTION

Problems to be Solved by the Invention

In view of such problems, an object of the present invention is to provide a process for manufacturing a nickel-cobalt composite hydroxide and provide a nickel-cobalt composite hydroxide obtained by the foregoing manufacturing process, the nickel-cobalt composite hydroxide having a narrow distribution of particle size and a uniform particle-diameter; when used as a raw material of a positive electrode active material for nonaqueous-electrolyte secondary batteries, allowing the positive electrode active material to have a narrow distribution of particle size and to be excellent in the uniformity of particle diameter; and leading to high productivity.

Means to Solve the Problems

The process for manufacturing the nickel-cobalt composite hydroxide according to the present invention which achieves the foregoing object is a process for manufacturing a nickel-cobalt composite hydroxide which is represented by a general formula: $Ni_{1-x-y}Co_xMn_yM_z(OH)_2$ (where, 0.05≤x≤0.95, 0≤y≤0.55, 0≤z≤0.1, x+y+z<1, and M is at least one metal element selected from Al, Mg, Ti, Fe, Cu, Zn, and Ga) and for use as a positive electrode active material for nonaqueous-electrolyte secondary batteries, and the process is characterized by including: a seed particle formation step in which, while a reaction solution which comprises a mixed solution containing metal compounds including metals constituting the general formula and an ammonia solution containing an ammonium ion supply source is agitated at a discharge head of an impeller of from 50 to 100 $m^2/s^2$, the concentration of nickel ions in the reaction solution is maintained within a range of from 0.1 to 5 ppm by mass, whereby seed particles are formed; and a seed particle growth step in which a solution for seed particle growth which is obtained by adding a mixed solution containing metal compounds including metals constituting the formula and an ammonium solution containing an ammonium ion supply source to the reaction solution containing the seed particles is agitated with the concentration of nickel ions being maintained within a range from 5 to 300 ppm by mass and higher than the concentration of nickel ions in the seed particle formation step, whereby the seed particles are grown up to attain nickel-cobalt composite hydroxide particles.

The nickel-cobalt composite hydroxide according to the present invention which achieves the foregoing object is represented by a formula: $Ni_{1-x-y}Co_xMn_yM_z(OH)_2$ (where, 0.05≤x≤0.95, 0≤y≤0.55, 0≤z≤0.1, x+y+z<1, and M is at least one metal element selected from Al, Mg, Ti, Fe, Cu, Zn, and Ga) and for use as a positive electrode active material for nonaqueous-electrolyte secondary batteries, and the nickel-cobalt composite hydroxide is characterized in that, when particle diameters at volume integrated values of 10%, 50%, and 90% in laser diffraction scattering particle size measurements are taken as D10, D50, and D90, respectively, the relations (D50−D10)/D50≤0.25 and (D90−D50)/D50≤0.25 are satisfied.

Effects of the Invention

According to the present invention, there can be achieved a nickel-cobalt composite hydroxide which has a narrow distribution of particle size and a uniform particle diameter, and, when used as a raw material of the positive electrode active material for nonaqueous-electrolyte secondary batteries, which allows the positive electrode active material to have a narrow distribution of particle size and to be excellent in the uniformity of particle diameter.

Furthermore, according to the present invention, the nickel-cobalt composite hydroxide can be easily mass-manufactured in a large scale. Furthermore, the present invention can apply a continuous process, and therefore the manufacturing process according to the present invention has high productivity.

BRIEF DESCRIPTION OF THE DRAWINGS

FIG. 1 is a flowchart illustrating the process for manufacturing the nickel-cobalt composite hydroxide according to the present invention.

DETAILED DESCRIPTION OF THE INVENTION

Hereinafter, the nickel-cobalt composite hydroxide and the process for manufacturing the same which adopt the present invention will be described in detail. It should be noted that the present invention is not limited to the following detailed description unless otherwise specified.

An embodiment according to the present invention will be described in the following order. It should be noted that, prior to a description of the nickel-cobalt composite hydroxide and the process for manufacturing the same which adopt the present invention, there will be described a positive electrode active material for nonaqueous-electrolyte secondary batteries and the relationship between the formation of nickel-cobalt composite hydroxide and the formation conditions thereof.

1. Positive electrode active material for nonaqueous-electrolyte secondary batteries
2. Formation of nickel-cobalt composite hydroxide and formation conditions thereof
3. Nickel-cobalt composite hydroxide
4. Process for manufacturing nickel-cobalt composite hydroxide
   4-1. Seed particle formation step
   4-2. Seed particle growth step
   4-3. Agitation strength and nickel ion in each step
   4-4. pH control, ammonia concentration, particle diameter, and others <1. Positive Electrode Active Material for Nonaqueous-electrolyte Secondary Batteries>

A nonaqueous-electrolyte secondary battery has a structure, for example, including a positive electrode, a negative electrode, a nonaqueous electrolyte solution, and a separator, each being enclosed in a case. The positive electrode is formed of a positive electrode mixture obtained by mixing a positive electrode active material, an electric conductive agent, and the like. It should be noted that the other constituents, including the negative electrode, are similar to those used for nonaqueous-electrolyte secondary batteries.

As a raw material of the positive electrode active material, nickel-cobalt composite hydroxide is used. Basically, the powder characteristics of the positive electrode active material are greatly affected by the powder characteristics of the nickel-cobalt composite hydroxide used as a raw material. A positive electrode active material having a narrow distribution of particle size leads to excellent battery characteristics such as cycle characteristics. Therefore, to achieve excellent battery characteristics, a positive electrode active material having a uniform particle diameter, that is, a lithium-nickel-cobalt composite oxide having a uniform particle diameter is required. In other words, a nickel-cobalt hydroxide which has a narrow distribution of particle size and is excellent in the uniformity of particle diameter is required as a raw material.

Here, the charge and discharge of individual positive electrode active material particles will be described. A charge-and-discharge reaction of lithium-nickel composite oxide is caused by Li ion insertion and desorption. Li ions in large particle size are present in larger amount than Li ions in small particle size, and therefore, in the case where Li ion desorption caused by a charge reaction is advanced in a system in which large-sized particles and small-sized particles are mixed, smaller-sized particles undergo a greater depth of charge, in other words, a state in which Li is excessively desorbed is more easily caused, and a repetition of charge and discharge causes a deterioration reaction of positive electrode active material particles to easily proceed. This deterioration reaction causes a decrease in capacity when charge and discharge are repeated.

On the other hand, positive electrode active material particles having a uniform particle diameter each undergo a similar depth of charge at the time of charge and discharge and then used, and therefore, the particles each are equally deteriorated. When viewed from the whole of a battery, a larger ratio of deteriorated particles causes a greater decrease in capacity, and hence, it is expected that a lithium-nickel composite oxide including particles having a uniform particle diameter leads to a smaller decrease in capacity at the time of use in cycles.

Furthermore, when a positive electrode plate is produced, a mixed slurry including a positive electrode active material and an electric conductive agent is produced, and the mixed slurry is applied onto a collecting electrode plate, and then, the plate is dried and rolled, whereby a positive electrode plate is obtained.

The charge-and-discharge capacity per battery volume can be made larger as the density of the positive electrode active material applied onto the collecting electrode plate and rolled is higher. The density of the positive electrode active material is greatly dependent on a particle size distribution thereof. Generally, various types of particle size distribution can be mentioned to distribute the achievement of a higher density, but, a positive electrode active material having a narrower distribution of particle size tends to have a higher density. That is, as mentioned above, even from a viewpoint of charge-and-discharge characteristics of individual particles, a uniform distribution of particle size is preferable, and furthermore, from a viewpoint of improvement in the density of an electrode plate at the time of battery manufacturing, and furthermore, from a viewpoint of improvement in charge-and-discharge capacity of a battery, a narrow distribution of particle size is preferable. In terms of D10, D50, and D90 in a cumulative particle-size distribution, as D10 and D90 are closer to D50, a narrower distribution of particle size is attained. That is, as mentioned later, as D10 and D90 of a nickel-cobalt composite hydroxide to serve as a raw material is closer to D50, the nickel-cobalt composite hydroxide has a narrower distribution of particle size and a more uniform particle diameter, and therefore, such nickel-cobalt composite hydroxide is used as a raw material.

<2. Formation of Nickel-cobalt Composite Hydroxide and Formation Conditions Thereof>

As mentioned above, to obtain a positive electrode active material having a narrow distribution of particle size and a uniform particle diameter, a nickel-cobalt composite hydroxide serving as a raw material needs to have a narrow distribution of particle size and a uniform particle diameter. Here, a typical relationship between the particle diameter of a nickel-cobalt composite hydroxide and the formation conditions thereof will be described.

In the case where crystals of a nickel-cobalt composite hydroxide are formed by a neutralization reaction of a raw material solution, in some cases, nucleation occurs independently, and in other cases, the particle growth of nuclei which are generated elsewhere occurs. In the case where only nucleation occurs and particle growth does not occur, particles having a target particle diameter are not obtained, and, on the other hand, as particle growth more preferentially occurs, particles having a larger particle diameter are obtained. Furthermore, in the case where only particle growth occurs and nucleation does not occur, certain particles cannot be continuously obtained.

For example, to continuously manufacture nickel-cobalt composite hydroxide particles, obtained particles need to be taken out continuously, and therefore, to keep the number of particles in a reaction system constant and make a reaction proceed continuously, continuous formation of particles, that is, continuous nucleation is required.

However, when nucleation continuously occurs in parallel with particle growth, particles with different degrees of particle growth, that is, particles having different particle diameters are obtained. Therefore, particularly, in the case where a continuous crystallization reaction is employed, it is difficult to obtain nickel-cobalt composite hydroxide particles having a uniform particle diameter.

Furthermore, in the case where nucleation and particle growth occur in parallel in the same reaction vessel, a balance between the nucleation and the particle growth is dependent on various conditions, such as the concentration of each ion in a reaction solution, a reaction temperature, and agitating conditions.

Generally, various conditions are preferably kept constant during a crystallization reaction. However, in the case where a crystallization reaction is industrially performed, minor variations in conditions cannot be avoided, and as a result, while a balance between nucleation and particle growth varies within a certain range, continuous crystallization is performed. At this time, when nucleation preferentially occurs, the number of particles in a reaction system increases, and accordingly a particle size distribution shifts in the direction of smaller particle diameters. On the contrary, when particle growth preferentially occurs, the number of particles in a reaction system decreases, and accordingly a particle size distribution shifts in the direction of larger particle diameters. That is, to continuously obtain a nickel-cobalt composite hydroxide having a fixed particle size distribution, a balance between nucleation and particle growth needs to be kept constant.

In a continuous crystallization reaction, as a process of controlling the particle size distribution and the crystal structure of a nickel-cobalt composite hydroxide to be formed, the control of the pH value of a reaction solution has been commonly employed.

In a crystallization reaction, when the concentration of metals contained in a supplied metal compound solution exceeds the solubility of metals in a reaction system, a precipitation reaction of a target metal compound occurs. Metal compounds having different crystal forms and different physical properties of powder are obtained by changing the solubility of metals in a reaction system. Generally, for example, when a pH is raised, the solubility of metals decreases, and the concentration of metal ions in a reaction solution decreases. The form of a metal compound at the time of a crystallization reaction can be changed by controlling the solubility of metals in a reaction solution, that is, the concentration of metal ions. Therefore, in a crystallization reaction of a nickel-cobalt composite hydroxide, not only the solubility of nickel, but also the solubility of cobalt is preferably controlled likewise.

However, when a solution containing nickel and cobalt is simply introduced into a reaction system having a low solubility, a great difference between the solubility at the then pH and the concentration of ions contained in the solution containing nickel and cobalt causes fine hydroxide particles to be precipitated at once and only a solution of hydroxide having a unfixed form to be obtained.

Therefore, ammonia is simultaneously supplied into the system together with the solution containing nickel and cobalt, whereby ammonia forms ammonium complex ions with nickel ions and cobalt ions, and the solubility at the same pH is made higher to make the precipitation of a hydroxide proceed slowly, and a process from precipitation to re-dissolution is repeated, whereby particles can be spherically grown up. That is, when the concentration of ammonium ions becomes higher, a larger amount of complex ions are formed, whereby the concentrations of nickel and cobalt in a reaction solution increase, and accordingly, nuclear growth occurs in preference to nucleation. Furthermore, the crystal form of a precipitated nickel-cobalt composite hydroxide changes with the amount of ammonium ions present.

As mentioned above, in the case where a nickel-cobalt composite hydroxide is formed by a crystallization reaction, the addition of ammonium to a solution containing nickel and cobalt allows a hydroxide to be slowly precipitated and grown spherically, and the crystal form of the nickel-cobalt composite hydroxide can be adjusted by the amount of ammonium ions present.

In such process for manufacturing a nickel-cobalt composite hydroxide by making use of a crystallization reaction, as mentioned later, a step of forming nuclei, that is, seed particles and a step of growing the seed particles are separated, and the agitating conditions and the nickel ion concentration of a reaction solution in each of the steps are controlled, whereby a nickel-cobalt composite hydroxide having a uniform particle diameter can be formed with high formability.

<3. Nickel-cobalt Composite Hydroxide>

The nickel-cobalt composite hydroxide (hereinafter, referred to as simply a composite hydroxide) is represented by a formula: $Ni_{1-x-y}Co_xMn_yM_z(OH)_2$ (where, $0.05 \leq x \leq 0.95$, $0 \leq y \leq 0.55$, $0 \leq z \leq 0.1$, $x+y+z<1$, and M is at least one metal element selected from Al, Mg, Ti, Fe, Cu, Zn, and Ga), and is a spherical secondary particle formed by aggregation of a plurality of plate-like primary particles.

In the formula, x, which represents the ratio of nickel and cobalt, satisfies $0.05 \leq x \leq 0.95$, and is more preferably from 0.1 to 0.9. That is, when x is less than 0.05, thermal stability and charge-and-discharge cycle characteristics are poor, which is not preferable. On the other hand, when x exceeds 0.95, the ratio of Co is high, thereby causing an increase in raw material costs, which is not preferable. Hence, to achieve a sufficient battery capacity, preferably, x is not more than 0.5, and more preferably, x+y+z is not more than 0.5.

The ratio of manganese, namely y, satisfies $0 \leq y \leq 0.55$. Manganese is an additive element contributing to thermal stability improvement. When y is more than 0.55, manganese dissolves into an electrolyte during storage or operation under high temperature environment, and accordingly the characteristics deteriorate. Furthermore, when y is more than 0.55, a larger amount of manganese is present, thereby causing a smaller theoretical capacity, and as a result, it is difficult to realize a nonaqueous-electrolyte secondary battery having a higher capacity.

The composite hydroxide is such that, when particle diameters at volume integrated values of 10%, 50%, and 90% in laser diffraction scattering particle size measurements are taken as D10, D50, and D90, respectively, the relations (D50−D10)/D50≤0.25 and (D90−D50)/D50≤0.25 are satisfied.

An index, (D50−D10)/D50, indicates how many fine particles are mixed in, and an index, (D90−D50)/D50, indicates how many coarse particles are mixed in. The individual control of these indexes enables fine particles and coarse particles to be appropriately prevented from being mixed in.

When each of the indexes is more than 0.25, the particle size distribution is wider, and fine particles and coarse particles are mixed in, and accordingly, the composite hydroxide does not have a uniform particle diameter. Therefore, in the case where a positive electrode active material is produced using such composite hydroxide, the obtained positive electrode active material contains fine particles and coarse particles.

Hence, an adjustment to satisfy the relations (D50−D10)/D50≤0.25, and (D90−D50)/D50≤0.25 allows a composite hydroxide having a narrow distribution of particle size and a uniform particle diameter to be attained.

Furthermore, D50 is preferably from 8 to 15 µm. When D50 is less than 8 µm, a high electrode density cannot be achieved when the composite hydroxide is made into a positive electrode active material, on the other hand, when D50 is more than 15 µm, the specific surface area of a positive electrode active material is decreased to cause a decrease in battery capacity and lower output characteristics. Therefore, in order to achieve a high electrode density and prevent a decrease in battery capacity and lower output characteristics when the composite hydroxide is made into a positive electrode active material, D50 is preferably from 8 to 15 µm.

<4. Process for Manufacturing Nickel-cobalt Composite Hydroxide>

The nickel-cobalt composite hydroxide having the foregoing characteristics can be manufactured by the following manufacturing process.

The process for manufacturing the composite hydroxide is a process for manufacturing nickel-cobalt-manganese composite hydroxide particles (hereinafter, referred to as simply composite hydroxide particles) by a crystallization reaction, and the process comprises a seed particle formation step of forming seed particles and a seed particle growth step of growing the seed particles obtained in the seed particle formation step.

That is, unlike a conventional continuous crystallization process by which a seed particle formation reaction and a seed particle growth reaction are made to simultaneously proceed in the same reaction vessel, the process for manufacturing the composite hydroxide according to the present invention is characterized in that time that mainly a seed particle formation reaction occurs (seed particle formation step) and time that mainly a seed particle growth reaction occurs (seed particle growth step) are clearly separated. Thus, the process for manufacturing the composite hydroxide according to the present invention enables the control of the particle form of the composite hydroxide which is to be formed. The foregoing separation is performed by controlling the concentration of nickel ions and the discharge head of an impeller, and as mentioned later, furthermore, a process of changing a pH value every step, a process in which a reaction vessel used for the seed particle formation step is different from a reaction vessel used for the seed particle growth step, and the like may be adopted, and, as long as the steps are performed separately, a separation process is not limited.

The process for manufacturing the composite hydroxide particles according to the present invention will be described based on FIG. 1.

(4-1. Seed Particle Formation Step)

In the seed particle formation step, as illustrated in FIG. 1, a mixed solution which contains metal compounds containing nickel and cobalt and furthermore containing manganese as needed, an ammonia solution containing an ammonium ion supply source, and an alkaline solution are agitated and mixed with controlling the concentration of nickel ions to be from 0.1 to 5 ppm by mass and controlling the discharge head of an impeller to be from 50 to 100 m$^2$/s$^2$, whereby seed particles are formed.

The mixed solution is produced in such a manner that a plurality of metal compounds containing metals, namely, nickel and cobalt, which constitute a nickel-cobalt composite hydroxide, and furthermore containing manganese as needed is dissolved into water at a predetermined ratio. In the process for manufacturing the composite hydroxide, the composition ratio of metals in an obtained composite hydroxide is similar to the composition ratio of metals in the mixed solution.

Therefore, the mixed solution is produced by adjusting the ratio of metal compounds to be dissolved into water so that the composition ratio of metals in the mixed solution is the same as the composition ratio of metals in target composite hydroxide particles.

In the seed particle formation step, first, an alkaline solution such as a sodium hydroxide solution, an ammonia solution containing an ammonium ion supply source, and water are mixed to produce a solution (hereinafter, referred to as a pre-reaction solution) is produced so that the crystallization of a hydroxide is made possible.

By adjusting the amount of the alkaline solution supplied, the pre-reaction solution is preferably adjusted so as to have a pH value of from 12.0 to 14.0, the pH value being measured at a reference liquid temperature of 25° C. Furthermore, the concentration of ammonium ions in the pre-reaction solution is preferably adjusted to from 5 to 15 g/L. The liquid temperature of the pre-reaction solution is preferably adjusted to from 20° C. to 60° C. It should be noted that the pH and the ammonium ion concentration of the pre-reaction solution can be measured with a common pH meter and a common ion meter, respectively.

Next, in the seed particle formation step, after the adjustment of the temperature and the pH value of the pre-reaction solution, with the pre-reaction solution being agitated, the mixed solution is supplied to the pre-reaction solution. Then, a solution in which the pre-reaction solution and the mixed solution are mixed (hereinafter, referred to as a reaction solution) is produced, whereby fine seed particles (nuclei) of a composite hydroxide can be formed in the reaction solution. At this time, the concentration of nickel ions in the reaction solution is controlled to be from 0.1 to 5 ppm by mass and the discharge head of the impeller is controlled to be from 50 to 100 m$^2$/s$^2$, whereby the form of formed particles can be controlled, and, with being prevented from growing up, seed particles are made to be formed. Furthermore, the pH value of the reaction solution is preferably adjusted to from 12.0 to 14.0, whereby formed seed particles hardly grow, and thus, control is exercised to further ensure a state in which the formation of seed particles preferentially occurs. Thus, in the seed particle formation step, seed particles are formed in the reaction solution to obtain a reaction solution containing seed particles (hereinafter, referred to as a seed-particle-containing slurry).

Furthermore, in the seed particle formation step, the control of agitation strength for mixing the pre-reaction solution with the mixed solution and the control of the concentration of nickel ions allow the number of seed particles formed per unit time to be controlled. In the seed particle formation step, the control of the number of seed particles formed per unit time allows variations in nucleation to be reduced, whereby composite hydroxide particles having a uniform particle size can be attained. Agitation strength and the concentration of nickel ions will be described in detail later.

In the seed particle formation step, the pH value and the ammonium ion concentration of the reaction solution change with the formation of seed particles, and hence, the alkaline solution and the ammonia solution are supplied together with the mixed solution to the reaction solution, whereby the pH value and the ammonium ion concentration of the reaction solution are controlled so as to be maintained at a predetermined value.

In the seed particle formation step, the mixed solution, the alkaline solution, and the ammonia solution are continuously supplied to the reaction solution, whereby new nuclei continue to be formed in the reaction solution. Therefore, it is beneficial that, until a necessary amount of seed particles is formed, the mixed solution, the alkaline solution, and the ammonia solution continue to be supplied. By performing a preliminary test to determine a relationship between the addition amount of metal salts used in the seed particle formation step and obtained seed particles, whether or not a predetermined amount of nuclei is formed can be easily judged from the amount of the metal salts added.

It should be noted that, in the seed particle formation step, while the pre-reaction solution having an adjusted pH value is agitated, the mixed solution is added thereto, whereby seed particles are formed, but, a process of forming seed particles is not limited to this, and the formation of seed particles may be performed in such a manner that, while the mixed solution is agitated, the pre-reaction solution is added thereto to adjust the pH, whereby seed particles are formed.

(4-2. Seed Particle Growth Step)

In the seed particle growth step, the concentration of nickel ions is controlled to be from 5 to 300 ppm by mass, whereby the seed particles obtained by the foregoing seed particle formation step are grown up to attain nickel composite hydroxide particles.

In the seed particle growth step, first, a seed-particle-containing slurry produced in the seed particle formation step is preferably adjusted so that the concentration of nickel ions at the time of adding a mixed solution is controlled to be from 5 to 300 ppm by mass. For example, as illustrated in FIG. 1, an adjustment is made by adding an alkaline solution to the seed-particle-containing slurry so as to preferably achieve a pH value of from 11.5 to 13.0, the pH value being measured at a reference liquid temperature of 25° C., whereby a slurry for seed particle growth is obtained.

In the seed particle growth step, the control of the concentration of nickel ions, preferably the control of the concentration of nickel ions and the discharge head of an impeller makes it possible to cause the occurrence of only the particle growth, but, the adjustment of the pH value of the slurry for seed particle growth to preferably from 11.5 to 13.0 allows the growth of seed particles in the slurry for seed particle growth to preferentially occurs, whereby composite hydroxide particles having a predetermined particle diameter are easily obtained. It should be noted that an adjustment of the pH value of the slurry for seed particle growth to from 11.5 to 12.5 allows a seed particle growth reaction to occur in preference to a seed particle formation reaction, and therefore, a state in which new seed particles are hardly formed in the slurry for seed particle growth can be maintained more easily.

Then, in the seed particle growth step, while the slurry for seed particle growth is agitated, a mixed solution which contains metal compounds containing nickel and cobalt and furthermore containing manganese as needed is added to the slurry for seed particle growth. That is, besides metal compounds containing nickel, a metal compound containing nickel, cobalt, manganese, or an additive element as needed is contained in a mixed solution so as to obtain a nickel composite hydroxide having a predetermined composition ratio. In the seed particle growth step, the composition ratio of metals in the seed particles to grow is similar to the composition ratio of metals in the mixed solution. Therefore, an adjustment is made so that the total of the metal salts used in the seed particle formation step and metal salts in the mixed solution used in the seed particle growth step constitutes the composition ratio of metals in a target nickel-cobalt composite hydroxide Then, until composite hydroxide particles having a predetermined particle diameter are formed, the particle growth step is continued. By performing a preliminary test to determine a relationship between the addition amount of metal salts used in the seed particle growth step and obtained seed particles, the particle diameter of composite hydroxide particles can be easily judged from the addition amount of the metal salts.

According to the foregoing process for manufacturing the composite hydroxide, in the seed particle formation step, seed particle formation preferentially occurs while seed particle growth hardly occurs, on the contrary, in the seed particle growth step, only seed particle growth occurs while new seed particles are hardly formed. That is, according to the foregoing process for manufacturing the composite hydroxide, the seed particle formation step and the seed particle growth step can be separately performed. Thus, in the seed particle formation step, seed particles having a narrow distribution of particle size and being uniform can be formed, on the other hand, in the seed particle growth step, nuclei can be uniformly grown up, and consequently, nickel-cobalt composite hydroxide particles having a narrow distribution of particle size and being uniform can be obtained.

It should be noted that, according to this process for manufacturing the nickel-cobalt composite hydroxide, in both of the steps, metal ions crystallize out as seed particles or composite hydroxide particles, and therefore, in the case of a batch process which does not discharge a solution for seed particle growth, a ratio of a liquid component to a metal component in the solution for seed particle growth increases. Then, the concentration of the mixed solution supplied seemingly decreases, and therefore, in the seed particle growth step, there is a risk that composite hydroxide particles do not sufficiently grow.

Therefore, in the case of adopting the batch process, in order to prevent the increase of the liquid component, an operation of discharging a part of the liquid component in the slurry for seed particle growth out of a reaction vessel is preferably carried out after the completion of the seed particle formation step and midway during the seed particle growth step. Specifically, for example, the supply of an inorganic alkaline solution and a mixed solution to the slurry for seed particle growth and the agitation thereof are stopped once, whereby plate-like crystal nuclei and nickel composite hydroxide particles are made to sediment, and a supernatant liquid of the slurry for seed particle growth is discharged. This allows the relative concentration of the mixed solution in the slurry for seed particle growth to be increased. Furthermore, nickel composite hydroxide particles can be grown up in a state in which the relative concentration of the mixed solution is kept high, and accordingly, the nickel composite hydroxide particles can have a narrower distribution of particle size, and furthermore, the whole of secondary particles of the nickel composite hydroxide particles can have a higher density.

The foregoing seed particle growth step has an advantage that the concentration of nickel ions in the seed-particle-containing slurry obtained by the completion of the seed particle formation step and the discharge head of an impeller, and furthermore the pH value as needed are adjusted to produce the slurry for seed particle growth, whereby the seed particle growth step is performed, and therefore, a shift to the particle growth step can be quickly done.

The seed particle growth step is not limited to the process illustrated in FIG. 1, and, particle growth may be performed in such a manner that, other than the seed-particle-containing slurry, there is prepared a component-adjusted solution which contains a mixed solution, an alkaline solution, and an ammonia solution and of which the discharge head, the pH value, and the concentration of ammonium ions are adjusted so as to be suitable for the seed particle growth step, and then, the seed-particle-containing slurry is added to this component-adjusted solution and, with the concentration of nickel ions being controlled, a mixed solution is added thereto, whereby particle growth is performed.

In this case, the seed particle formation step and the seed particle growth step can be more surely separated, and therefore, the state of the reaction solution in each of the steps can be optimized for the corresponding one of the steps. Particularly, the concentration of nickel ions in the reaction solution and a discharge head can be optimized from an initial stage to start the seed particle growth step. This allows the nickel-cobalt composite hydroxide particles formed in the seed particle growth step to have a narrower distribution of particle size and be uniform.

Furthermore, in the foregoing process for manufacturing the composite hydroxide, by continuously supplying the seed-particle-containing slurry from the seed particle formation step and growing seed particles in the seed particle growth step, that is, by a continuous crystallization process, composite hydroxide particles having an excellent distribution of particle size can be obtained. In the conventional process in which the steps are separated by the control of pH, the stability of the number of formed seed particles is not satisfactory, and, when the continuous crystallization process is adopted, a sufficiently narrow distribution of particle size distribution cannot be achieved.

On the other hand, according to the foregoing process for manufacturing the composite hydroxide, the control of the concentration of nickel ions and a discharge head allows the number of formed seed particles to be sufficiently stabilized and the particles to be grown up, and therefore, even in the case of employing the continuous crystallization process, the particle size distribution can be kept narrow. Furthermore, the concentration of nickel ions is controllable by the pH, the ammonium ion concentration, and the temperature of a solution, and therefore, compared to a case where only the control of pH is applied, the concentration of nickel ions can be more easily controlled so as to be in an appropriate range, and, even in the case of employing the continuous crystallization process, the concentration of nickel ions can be more stably controlled.

(4-3. Agitation Strength and Nickel Ion in Each Step)

Next, there will be described the control of agitation strength and the control of nickel ions and cobalt ions in the seed particle formation step and the seed particle growth step.

As an agitation strength scale, a discharge head exerted on an impeller of an agitator used can be employed. A discharge head H ($m^2/s^2$) of an agitator is calculated by Equation 1 using an agitation power number Np, a discharge flow quantity number Nq, a diameter D (m) of an impeller of the agitator, and the number of agitation revolutions n (1/s). Furthermore, the discharge flow quantity number Nq is calculated by Equation 2 using a discharge flow quantity Q ($m^3/s$), the diameter D (m) of the impeller of the agitator, and the number of agitation revolutions n (1/s).

$$H = (Np/Nq) \cdot D^2 \cdot n^2 \qquad \text{Equation 1}$$

$$Q = Nq \cdot D^3 \cdot n \qquad \text{Equation 2}$$

In the seed particle formation step, the discharge head of the impeller is from 50 to 100 $m^2/s^2$, and the nickel ion concentration of the reaction solution is maintained within a range from 0.1 to 5 ppm by mass to perform the seed particle formation. In the manufacturing process according to the present invention, it has been confirmed that the solubility of cobalt is uniquely determined by a factor which determines the solubility of nickel, and thus, by taking the solubility of nickel, that is, the concentration of nickel ions as an index and controlling that concentration, the concentration of cobalt ions can be also simultaneously controlled to be in an appropriate range.

A low concentration of nickel ions or a low concentration of cobalt ions leads to an increase in the number of formed seed particles, on the contrary, a high discharge head leads to an increase in the number of formed nuclei. In the region where the number of formed seed particles is relatively small, the number of formed nuclei varies greatly due to fluctuations of crystallization conditions, and as a result, the uniformity of particle diameters and the stability are sometimes impaired. That is, to keep the number of formed nuclei stable, the concentrations of nickel ions and cobalt ions are preferably lower and the discharge head is preferably higher.

A discharge head of less than 50 $m^2/s^2$ causes the aggregation of seed particles, whereby the number of formed seed particles varies and variations in particle diameter of seed particles are caused, and accordingly, the particle size distribution of obtained composite hydroxide particles gets worse, On the other hand, a discharge head of more than 100 $m^2/s^2$ does not bring about an improvement in the effect of stabilizing the number of formed seed particles.

A nickel ion concentration of less than 0.1 ppm by mass causes seed particles to be excessively made fine and aggregate, or causes a seed-particle-containing slurry to be gelatinized, whereby it becomes difficult to control a reaction. On the other hand, a nickel ion concentration of more than 5 ppm by mass causes the number of formed nuclei to vary more greatly and particle growth to occur.

In the seed particle growth step, the concentration of nickel ions is maintained in a range from 5 to 300 ppm by mass, and is made higher than the concentration of nickel ions in the seed particle formation step. Furthermore, in the seed particle growth step, when a mixed solution is added to a slurry for seed particle growth while the slurry is agitated, the discharge head of an impeller is preferably from 10 to 50 m²/s² and lower than the discharge head of an impeller in the seed particle formation step. The discharge head is more preferably from 10 to 45 m²/s², and still more preferably from 10 to 40 m²/s².

A nickel ion concentration of less than 5 ppm by mass causes seed particles to be formed in the slurry for seed particle growth, whereby the particle size distribution of composite hydroxide particles gets worse. On the other hand, a nickel ion concentration of more than 300 ppm by mass causes the growth rate of seed particles to be considerably decreased, whereby productivity is greatly reduced. Furthermore, this causes the amount of metals contained in waste fluid to be increased, whereby yields are reduced.

A discharge head of the impeller of less than 10 m²/s² causes the aggregation of particles, whereby the particle size distribution of the nickel-cobalt composite hydroxide sometimes gets worse. On the other hand, a discharge head of more than 50 m²/s² causes particles to be crushed and fine particles to occur, whereby the particle size distribution of the composite hydroxide particles sometimes gets worse.

As mentioned above, in the seed particle formation step, the concentration of nickel ions is controlled so as to be low and the discharge head is controlled so as to be high, whereby the number of formed seed particles can be kept stable. On the other hand, in the seed particle growth step, the concentration of nickel ions is controlled so as to be high, and furthermore, preferably, the discharge head is controlled so as to be low, whereby, while the occurrence of seed particles is prevented, the growth of seed particles can be preferentially advanced. Furthermore, in each stage of the seed particle development step and the seed particle growth step, in a case where there is time during which the solubilities of nickel and cobalt are deviated from a range suitable for the each stage, during that time, particle growth occurs in the seed particle formation stage, or nucleation occurs in the seed particle growth stage, whereby the uniformity of particle diameters and the stability are lost.

Therefore, crystallization conditions in the seed particle formation step are made such that, during the whole of the step, the concentration of nickel ions is kept low and the discharge head is kept high, whereby the number of formed nuclei, that is, formed seed particles is increased, and the number of formed seed particles per unit time during crystallization can be stabilized. Furthermore, formed seed particles are introduced to the seed particle growth step and the concentration of nickel ions is maintained within an optimal range over the whole of the seed particle growth step, whereby particle growth can be preferentially performed. This makes it possible to perform a crystallization reaction which achieves a narrower distribution of particle size, a more uniform particle diameter, and a smaller variation in particle size distribution during crystallization, compared to a process of performing seed particle formation and seed particle growth in a single reaction vessel.

(4-4. pH Control, Ammonia Concentration, Particle Diameter, and Others)

Substances and solutions, and reaction conditions applied in each of the steps will be described.

(pH in Seed Particle Formation Step)

In the seed particle formation step, the reaction solution is adjusted to have a pH value of preferably from 12.0 to 14.0, more preferably from 12.0 to 13.5, the pH value being measured at a reference liquid temperature of 25° C.

When the pH value is higher than 14.0, the concentration of nickel ions is decreased and excessively fine seed particles are formed, whereby the reaction solution is sometimes gelatinized. On the other hand, when the pH value is less than 12.0, the concentration of nickel ions is increased, and seed particle are formed and a seed particle growth reaction occurs, and accordingly, sometimes the particle size distribution of formed nuclei is wider and the nuclei are non-uniform.

Therefore, the pH value of the reaction solution in the seed particle formation step is preferably adjusted to from 12.0 to 14.0. In the seed particle formation step, the adjustment of the pH value to from 12.0 to 14.0 allows seed particle growth to be prevented and nucleation to be preferentially caused, whereby formed seed particles are more uniform and have a narrower distribution of particle size.

(pH in Seed Particle Growth Step)

In the seed particle growth step, the seed-particle-containing slurry is adjusted to have a pH value of preferably from 11.5 to 13.0, more preferably from 11.5 to 12.5, the pH value being measured at a reference liquid temperature of 25° C.

When the pH value is higher than 13.0, the number of seed particles newly formed is increased, whereby composite hydroxide particles having a narrow distribution of particle size sometimes cannot be obtained. When the pH value is less than 11.5, high solubility is caused by ammonia ions, and accordingly, more metal ions remain in the slurry without being precipitated, which is not preferable. Therefore, the pH value of the seed-particle-containing slurry in the seed particle growth step is preferably adjusted to from 11.5 to 13.0. In the seed particle growth step, the adjustment of the pH value to from 11.5 to 13.0 allows the growth of seed particles formed in the seed particle formation step to preferentially occur and new seed particles to be prevented from being formed, whereby formed nickel-cobalt composite hydroxide particles are more uniform and have a narrower distribution of particle size.

(Ammonia Concentration)

In the seed particle formation step, the concentration of ammonia (the concentration of ammonium ions) in the reaction solution is preferably controlled to be from 5 to 15 g/L, and in the seed particle growth step, the concentration of ammonia in the slurry for seed particle growth is preferably controlled to be from 10 to 20 g/L. In the seed particle formation step and the seed particle growth step, the respective concentrations of ammonia are thus independently adjusted, whereby the concentration of nickel ions in each of the steps can be easily adjusted.

In the seed particle formation step, when the concentration of ammonia is less than 5 g/L, the solubility of metals (particularly, nickel and cobalt) cannot be maintained constant, and therefore, seed particles having a uniform form and a uniform particle diameter cannot be obtained, and gel-like seed particles are easily formed, and consequently, the particle size distribution is sometimes wider. On the other hand, when the concentration of ammonia is more than 15 g/L, the solubility of metals is too higher, and accordingly, the amount of metal ions remaining in the reaction solution is increased, whereby composition deviation and the like are sometimes caused.

In the seed particle growth step, when the concentration of ammonia is less than 10 g/L, the solubility of metals cannot be maintained constant, and seed particles are non-uniformly grown, thereby causing variations in the width of secondary particles. On the other hand, when the concentration of ammonia is more than 20 g/L, the solubility of metals is too high, and accordingly, the amount of metal ions remaining in the slurry for seed particle growth is increased, whereby composition deviation and the like are sometimes caused.

Furthermore, when the concentration of ammonia varies, the solubility of metals varies, and accordingly, uniform hydroxide particles are not formed, and therefore, the concentration of ammonia is preferably maintained to be a constant value. For example, the concentration of ammonia is preferably maintained to be a desired value with the difference between upper and lower limits being set to approximately 5 g/L.

The ammonium ion supply source is not particularly limited, but, for example, ammonia, ammonium sulfate, ammonium chloride, ammonium carbonate, ammonium fluoride, or the like may be used.

(Amount of Formed Seed Particles)

The amount of seed particles formed in the seed particle formation step is not particularly limited, but, to obtain composite hydroxide particles having an excellent distribution of particle size, for example, in a batch process, the amount of formed seed particles is preferably from 0.1% to 10%, more preferably not more than 5% of the whole amount, that is, not more than 5% of all metal salts which are supplied to obtain composite hydroxide particles. In a continuous crystallization process, the amount of seed particles can be adjusted by the feeding rate ratio of metals supplied to each of reaction vessels in the seed particle formation step and the seed particle growth step, and the amount of seed particles, that is, the feeding rate of metals in the seed particle formation step is preferably from 5% to 20% of the feeding rate in the seed particle growth step.

(Particle Diameter Control for Composite Hydroxide Particles)

The particle diameter of the composite hydroxide particles can be controlled by making use of the time for the seed particle growth step and the amount of a metal source supplied, and therefore, when the particle growth step is continued until the particles grow up to have a desired particle diameter, the composite hydroxide particles having a desired particle diameter can be obtained. For example, in the case where a continuous crystallization process is employed, it is beneficial that a residence time of the particles in the vessel is set to be equal to the time required for growth and the adjustment is performed by the concentration of and the amount of the mixed solution supplied.

The particle diameter of the composite hydroxide particles can be controlled not only by the seed particle growth step, but also by the concentration of nickel ions and agitation strength in the seed particle formation step, and the amount of raw materials fed for seed particle formation. That is, in the seed particle formation step, when the number of seed particles is controlled to be large, even if the seed particle growth step is carried out under the same conditions, the particle diameter of composite hydroxide particles can be made small. On the contrary, when the number of formed seed particles is controlled to be small, the particle diameter of the obtained composite hydroxide particles can be made large.

(Other Conditions)

Hereinafter, the conditions of metal compounds, ammonia concentration in the reaction solution, reaction temperature, atmosphere, and the like will be described. The differences in conditions between the seed particle formation step and the seed particle growth step are, as mentioned above, the control ranges for agitation strength, the concentrations of nickel ions and cobalt ions, pH values, and the concentration of ammonia, on the other hand, other conditions are substantially the same in both of the steps.

(Metal Compound)

As the metal compound, a compound containing a target metal is used. The compound to be used is not particularly limited, but, a water-soluble compound is preferably used, and examples of the compound include nitrate, sulfate, and hydrochloride. For example, nickel sulfate, cobalt sulfate, and manganese sulfate are preferably used.

(Additive Element)

The additive element (at least one element selected from Ti, V, Cr, Al, Mg, Zr, Nb, Mo, Hf, Ta, and W) is not particularly limited, but, a water-soluble compound is preferably used, and, for example, titanium sulfate, ammonium peroxotitanate, potassium titanium oxalate, vanadium sulfate, ammonium vanadate, chromium sulfate, potassium chromate, zirconium sulfate, zirconium nitrate, niobium oxalate, ammonium molybdate, sodium tungstate, ammonium tungstate, or the like may be used.

To uniformly disperse such additive element inside the composite hydroxide particles, it is beneficial to add an additive containing the additive element to the mixed solution. This allows coprecipitation to be performed in a state in which the additive element is uniformly dispersed inside the composite hydroxide particles.

In the case where the surfaces of the composite hydroxide particles are coated with the additive element to be added, for example, the composite hydroxide particles are made into a slurry by using a solution containing the additive element, and the additive element is precipitated on the surfaces of the composite hydroxide particles by a crystallization reaction, whereby the surfaces can be covered with the additive element. In this case, instead of the solution containing the additive element, an alkoxide solution of the additive element may be used. Furthermore, the surfaces of the composite hydroxide particles can be coated with the additive element also in such a manner that a solution or a slurry containing the additive element is sprayed onto the composite hydroxide particles and dried.

It should be noted that, in the case where the surfaces are coated with the additive element, an atomic ratio of additive element ions present in the mixed solution is made smaller by the coating amount, whereby the atomic ratio can be made in agreement with an atomic ratio of metal ions in obtained composite hydroxide particles.

(Concentration of Mixed Solution)

The mixed solution preferably has a total metal compound concentration of from 1 to 2.4 mol/L. Even if the mixed solution has a concentration of less than 1 mol/L, the composite hydroxide particles can be crystallized, but, the amount of crystallized particles per reaction vessel is smaller, and productivity is reduced accordingly, which is not preferable.

On the other hand, when the mixed solution has a salt concentration of more than 2.4 mol/L, the concentration is higher than the saturation concentration of the solution at room temperature, whereby crystals are re-precipitated to cause a trouble such as blocking of equipment piping.

The metal compounds may not be necessarily supplied to a reaction vessel in the form of a mixed solution, and may be supplied to a reaction vessel in the form of solutions of individual metal compounds at a predetermined ratio so that a total concentration of all the metal compounds in the reaction solution is in the foregoing concentration range.

Furthermore, the amount of the mixed solution or the individual metal compound solutions to be supplied to a reaction vessel is preferably such that, in a batch process, the concentration of crystallized particles at the time of completion of the crystallization reaction is approximately from 30 to 200 g/L. This is because, when the concentration of the crystallized particles is less than 30 g/L, aggregation of primary particles is sometimes insufficient, on the other hand, when the concentration of the crystallized particles is more than 200 g/L, the added mixed solution insufficiently diffuses into the reaction vessel and accordingly non-uniform particle-growth is sometimes caused. On the other hand, in the case of a continuous crystallization process, the concentration of crystallized particles in the seed particle growth step is a value obtained by converting, into a hydroxide concentration, a value which is obtained by dividing the feeding rate of all the metal supplied by the total feeding rate of the mixed solution, the alkaline solution, and the ammonia solution which are supplied in the seed particle formation step and the seed particle growth step.

(Liquid Temperatures of Reaction Solution and Seed Particle Growth Slurry)

The liquid temperatures of the reaction solution and the seed particle growth slurry at the time of reaction each are preferably set to not less than 20° C., more preferably set to from 20 to 60° C. When the liquid temperatures are less than 20° C., such low temperature causes seed particles to be easily formed, whereby the seed particle formation is hard to be controlled. On the other hand, the liquid temperatures are more than 60° C., volatilization of ammonia is accelerated, and therefore, to maintain a predetermined concentration of ammonia, an ammonium ion supply source sometimes needs to be excessively added.

(Alkaline Solution)

The alkaline solution to adjust a pH value is not particularly limited, and, for example, a solution of alkali metal hydroxide, such as sodium hydroxide or potassium hydroxide, may be used. Such alkali metal hydroxide may be directly added to a mixed solution before the solution is supplied to a reaction vessel, but is preferably added in the form of a solution to the reaction solution in the reaction vessel because this makes it easier to control the pH value of the reaction solution.

Furthermore, a way of adding the alkaline solution to the reaction vessel is not particularly limited, and it is beneficial that, while the mixed solution is sufficiently agitated, the alkaline solution is added by a pump capable of controlling a flow rate, such as a metering pump, so as to maintain the pH value of the reaction solution in the reaction vessel within a predetermined range.

(Reaction Atmosphere)

The atmosphere during reaction is not particularly limited, but, for stable manufacturing, an excessively oxidizing atmosphere is not preferable. The control of the atmosphere during reaction is preferably carried out at least in the seed particle growth step, and for example, while the concentration of oxygen in a space inside a reaction vessel is controlled to be not more than 10%, a crystallization reaction is performed, whereby unnecessary oxidation of particles can be prevented and particles having an uniform particle size can be obtained. Examples of means to keep the space inside the reaction vessel in the foregoing state include the continuous circulation of inert gas such as nitrogen in the vessel.

(Manufacturing Facility)

In the process for manufacturing the nickel-cobalt composite hydroxide, the specifications of the reaction vessel and a process for adjusting the supply amount of each of the solutions are not particularly limited, and any of a batch process and a continuous crystallization process may be used. However, a continuous crystallization process is preferable in which, using a vessel equipped with an agitator and a temperature control device as the reaction vessel, a mixed solution containing nickel, cobalt, and the like, and an ammonia solution containing an ammonium ion supply source are quantitatively continuously supplied to the reaction vessel, and an alkaline solution is supplied thereto in an adjusted addition-amount, whereby a reaction solution and a seed particle growth slurry in the above-mentioned reaction vessel undergo a reaction with a predetermined nickel ion concentration and a predetermined agitation strength being maintained, and formed composite hydroxide particles are continuously discharged.

As a manufacturing facility for the continuous crystallization process, for example, there may be employed a facility including a first reaction vessel configured to perform the seed particle formation step and a second reaction vessel configured to perform the seed particle growth step, in which the first reaction vessel and the second reaction vessel are connected so as to make it possible to continuously supply a seed-particle-containing slurry from the first reaction vessel to the second reaction vessel. A means to make the continuous supply possible is not particularly limited as long as the continuous supply can be carried out, and for example, the continuous supply may be performed by overflow.

A process for collecting the formed nickel-cobalt composite hydroxide is not particularly limited, and for example, there may be employed a process of making a reaction solution containing a nickel-cobalt composite hydroxide overflow from a reaction vessel (the second reaction vessel) in which the seed particle growth step is performed and collecting the nickel-cobalt composite hydroxide.

In the foregoing process for manufacturing the nickel-cobalt composite hydroxide, the seed particle formation step and the seed particle growth step are separately performed, and, in the seed particle formation step, while the reaction solution including the mixed solution and the ammonium solution is agitated at a discharge head of an impeller of from 50 to 100 $m^2/s^2$, the concentration of nickel ions in the reaction solution is maintained in a range from 0.1 to 5 ppm by mass, whereby seed particles are formed, and, in the seed particle growth step, while the concentration of nickel ions is maintained in a range from 5 to 300 ppm by mass and higher than the concentration of nickel ions in the above-mentioned seed particle formation step, agitation is performed, whereby seed particles are stably formed in the seed particle formation step, and in the seed particle growth step, particle growth preferentially occurs. Thus, according to the process for manufacturing the nickel-cobalt composite hydroxide, a nickel-cobalt composite hydroxide having a uniform particle size can be obtained.

Furthermore, in the process for manufacturing the nickel-cobalt composite hydroxide, not a batch type but a continuous type process can be applied, and therefore, the nickel-cobalt composite hydroxide can be easily and efficiently manufactured. Hence, the process for manufacturing the nickel-cobalt composite hydroxide has a great industrial value.

Furthermore, the nickel-cobalt composite hydroxide obtained by this process for manufacturing the nickel-cobalt composite hydroxide is heat-treated, and a mixture obtained by mixing the obtained nickel-cobalt composite hydroxide with a lithium compound is baked, whereby a lithium-nickel-cobalt composite oxide, that is, a positive electrode active material for nonaqueous-electrolyte secondary batteries can be obtained. The obtained positive electrode active material has a uniform particle diameter and a narrow distribution of particle size, and therefore, excellent battery characteristics such as cycle characteristics are achieved.

EXAMPLES

Hereinafter, specific Examples adopting the present invention will be described, but, the present invention is not limited to these Examples.

Example 1

In Example 1, 1.5 L of industrial water and 300 ml of 25 wt % ammonia water were fed into an overflow type crystallization reaction vessel I having a vessel volume of 2 L and having four baffle plates attached thereto, and heated to 50° C. by a thermostat and a heating jacket, and then a 24% caustic soda solution was added thereto, whereby the pH of a pre-reaction solution at 25° C. was controlled to be maintained in a range from 12.8 to 12.9. Actually, to precisely perform the pH control, the pre-reaction solution was taken and cooled to 25° C. and the pH thereof was measured, and the pH thereof at 50° C. was adjusted to 11.8 so as to achieve a pH at 25° C. of from 12.8 to 12.9, whereby the pre-reaction solution was obtained.

Using a three-bladed turbine impeller having a diameter of 3 cm, agitation was performed at 1500 rpm in the crystallization reaction vessel I. The discharge head calculated from the foregoing Equation 1 and Equation 2 was 50 $m^2/s^2$.

A crystallization reaction in the crystallization reaction vessel I was performed in such a manner that, while the pre-reaction solution maintained at 50° C. was agitated, a composite solution (hereinafter, referred to as a mixed solution) of nickel sulfate having a Ni molarity of 1.69 mol/L and cobalt sulfate having a Co molarity of 0.31 mol/L was supplied at 5 ml/min using a metering pump, and, at the same time, while 25 wt % ammonia water was supplied at 0.5 ml/min, a 24% caustic soda solution was intermittently added, whereby the pH at 25° C. was controlled to be from 12.8 to 12.9. At this time, the concentration of nickel ions in the solution was from 1 to 2 ppm.

Then, the crystallized particles (seed particles) continuously discharged from the crystallization reaction vessel I by overflow was introduced to a crystallization reaction vessel II. The configuration of the crystallization reaction vessel and crystallization conditions were as follows. Into the overflow type crystallization reaction vessel II having a vessel volume of 34 L and having four baffle plates attached thereto, 32 L of industrial water and 1300 ml of 25 wt % ammonia water were fed, and heated to 50° C. by a thermostat and a heating jacket, and a 24% caustic soda solution was added thereto, whereby the pH inside the vessel at 25° C. was controlled so as to be maintained in a range from 12.1 to 12.3. Actually, to precisely perform the pH control, the solution in the vessel was taken and cooled to 25° C. and the pH thereof was measured, and the pH at 50° C. was adjusted to 11.2 so as to achieve a pH at 25° C. of from 12.1 to 12.3.

Using a three-bladed turbine impeller having a diameter of 10 cm, agitation was performed at 1000 rpm in the crystallization reaction vessel II. The discharge head calculated from the foregoing Equation 1 and Equation 2 was 10 $m^2/s^2$.

A crystallization reaction in the crystallization reaction vessel II was performed in such a manner that, while agitation was performed inside the reaction vessel maintained at 50° C., a composite solution (hereinafter, referred to as a mixed solution) of nickel sulfate having a Ni molarity of 1.69 mol/L and cobalt sulfate having a Co molarity of 0.31 mol/L was supplied at 30 ml/min using a metering pump, and, at the same time, while 25 wt % ammonia water was supplied at 2.5 ml/min, a 24% caustic soda solution was intermittently added, whereby the pH at 25° C. was controlled to be from 12.2 to 12.3. At this time, the concentration of nickel ions in the solution was from 250 to 300 ppm.

Next, a nickel-cobalt composite hydroxide was continuously collected from the crystallization reaction tank II by overflow, and then, the nickel-cobalt composite hydroxide was suitably solid-liquid separated, washed by water, and dried, whereby a nickel-cobalt composite hydroxide in powder form was obtained. Using a laser diffraction particle size distribution measuring apparatus (trade name: Microtrac, manufactured by Nikkiso Co., Ltd.), a particle size distribution was measured to determine D10, D50, and D90. (D50–D10)/D50 was 0.24, and (D90–D50)/D50 was 0.21.

Examples 2 to 6, Comparative Examples 1 to 6

In Examples 2 to 6 and Comparative Examples 1 to 6, a nickel-cobalt composite hydroxide was obtained and evaluated in the same manner as in Example 1, except that the respective nickel concentrations of the solutions in the crystallization reaction vessel I and the crystallization reaction vessel II were changed by adjusting pH and the concentration of ammonia, and the discharge head was changed by adjusting the number of revolutions of an agitator. Table 1 shows evaluation results.

TABLE 1

| | Reaction vessel I | | Reaction vessel II | | Particle diameter of obtained nickel-cobalt composite hydroxide | | | | |
|---|---|---|---|---|---|---|---|---|---|
| | Ni concentration in solution ppm | Discharge head $m^2/s^2$ | Ni concentration in solution ppm | Discharge head $m^2/s^2$ | D10 μm | D50 μm | D90 μm | (D50 − D10)/D50 μm/μm | (D90 − D50)/D50 μm/μm |
| Example 1 | 1-2 | 50 | 250-300 | 10 | 7.8 | 10.2 | 12.3 | 0.24 | 0.21 |
| Example 2 | 1-2 | 75 | 250-300 | 10 | 8.0 | 10.2 | 12.3 | 0.22 | 0.21 |
| Example 3 | 1-2 | 100 | 250-300 | 10 | 8.1 | 10.0 | 11.9 | 0.19 | 0.19 |
| Example 4 | 3-5 | 75 | 250-300 | 10 | 8.8 | 11.3 | 14.0 | 0.22 | 0.24 |
| Example 5 | 1-2 | 75 | 5-10 | 25 | 8.1 | 10.6 | 12.8 | 0.24 | 0.21 |
| Example 6 | 1-2 | 75 | 250-300 | 45 | 8.0 | 10.5 | 13.1 | 0.24 | 0.25 |
| Comparative Example 1 | 1-2 | 25 | 250-300 | 10 | 6.4 | 11.5 | 16.2 | 0.44 | 0.41 |
| Comparative Example 2 | 6-10 | 75 | 250-300 | 10 | 7.1 | 10.8 | 14.8 | 0.34 | 0.37 |
| Comparative Example 3 | 10-20 | 75 | 250-300 | 10 | 6.4 | 11.5 | 16.9 | 0.44 | 0.47 |

TABLE 1-continued

|  | Reaction vessel I | | Reaction vessel II | | Particle diameter of obtained nickel-cobalt composite hydroxide | | | | |
| --- | --- | --- | --- | --- | --- | --- | --- | --- | --- |
|  | Ni concentration in solution ppm | Discharge head m$^2$/s$^2$ | Ni concentration in solution ppm | Discharge head m$^2$/s$^2$ | D10 μm | D50 μm | D90 μm | (D50 − D10)/ D50 μm/μm | (D90 − D50)/ D50 μm/μm |
| Comparative Example 4 | 1-2 | 75 | 1-2 | 8 | 1.3 | 3.2 | 5.2 | 0.59 | 0.63 |
| Comparative Example 5 | 1-2 | 75 | 2-4 | 8 | 2.5 | 5.6 | 9.2 | 0.55 | 0.64 |
| Comparative Example 6 | 1-2 | 75 | 2-4 | 80 | 3.1 | 6.1 | 8.9 | 0.49 | 0.46 |

From the results shown in Table 1, it is clear that, in Examples 1 to 6, the respective particle size distributions of the nickel-cobalt composite hydroxides satisfy the relations, (D50−D10)/D50≤0.25 and (D90−D50)/D50≤0.25, and particles having a narrow distribution of particle size and a uniform particle diameter are obtained.

In Example 6, the discharge head of the impeller in the seed particle growth step was higher than those in Examples 1 to 5, and therefore, the values, (D50−D10)/D50 and (D90−D50)/D50, are slightly larger than those in Examples 1 to 5. From this, it is clear that a low discharge head in the particle growth step allows particles having a narrow distribution of particle size and a uniform particle diameter to be obtained.

On the other hand, in Comparative Example 1, the discharge head in the seed particle formation step is lower; in Comparative Examples 2 and 3, the concentration of nickel ions is higher; in Comparative Examples 4 and 5, the concentration of nickel ions in the seed particle growth step is lower and the discharge head is lower; and in Comparative Example 6, the concentration of nickel ions is lower and the discharge head is higher, and hence, it is clear that, in each of Comparative Examples 1 to 6, the particle size distribution is wider and fine particles and coarse particles are mixed in.

Furthermore, using the composite hydroxides of Examples and Comparative Examples, positive electrode active materials were obtained by a well-known process, and as a result, each of the particle size distributions of the positive electrode active materials is similar to the corresponding one of the particle size distributions of the composite hydroxides, and hence, it was confirmed that, according to the present invention, a positive electrode active material having an excellent uniformity in particle diameter is obtained.

The invention claimed is:

1. A nickel-cobalt composite hydroxide which is represented by a general formula: $Ni_{1-x-y}Co_xMn_yM_z(OH)_2$ (where, 0.05≤x≤0.95, 0≤y≤0.55, 0≤z≤0.1, x+y+z<1, and M is at least one metal element selected from Al, Mg, Ti, Fe, Cu, Zn, and Ga) and for use as a positive electrode active material for nonaqueous-electrolyte secondary batteries,
wherein, when particle diameters at volume integrated values of 10%, 50%, and 90% in laser diffraction scattering particle size measurements are taken as D10, D50, and D90, respectively, relations, (D50−D10)/D50≤0.25 and (D90−D50)/D50≤0.25, are satisfied and the D50 is from 8 to 15 μm.

2. The nickel-cobalt composite hydroxide according to claim 1, wherein (D50−D10)/D50≤0.24 is satisfied.

3. The nickel-cobalt composite hydroxide according to claim 1, wherein (D90−D50)/D50≤0.24 is satisfied.

* * * * *